(No Model.)

E. B. FRINK.
POTATO DIGGER.

No. 572,886. Patented Dec. 8, 1896.

WITNESSES:
Edward Thorpe
Fred Acker

INVENTOR
E. B. Frink
BY Munn & Co
ATTORNEY.

UNITED STATES PATENT OFFICE.

EDMUND B. FRINK, OF OXFORD, MICHIGAN.

POTATO-DIGGER.

SPECIFICATION forming part of Letters Patent No. 572,886, dated December 8, 1896.

Application filed December 11, 1895. Serial No. 571,724. (No model.)

*To all whom it may concern:*

Be it known that I, EDMUND B. FRINK, of Oxford, in the county of Oakland and State of Michigan, have invented a new and useful Improvement in Potato-Diggers, of which the following is a full, clear, and exact description.

My invention relates to an improvement in potato-diggers; and the object of the invention is to provide a machine of this character of exceedingly simple and durable construction, comprising a spade or shovel adapted to enter the ground beneath the potatoes and loosen the same, drawing them up to the surface, and a rake the teeth of which will enter the ground and permit the potatoes to pass between them lying on the surface, freeing them from dirt, the said rake acting at the same time to remove the tops and conduct them to one side, placing them in windrows, thereby disposing of the tops and leaving the potatoes exposed to be dried and gathered.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
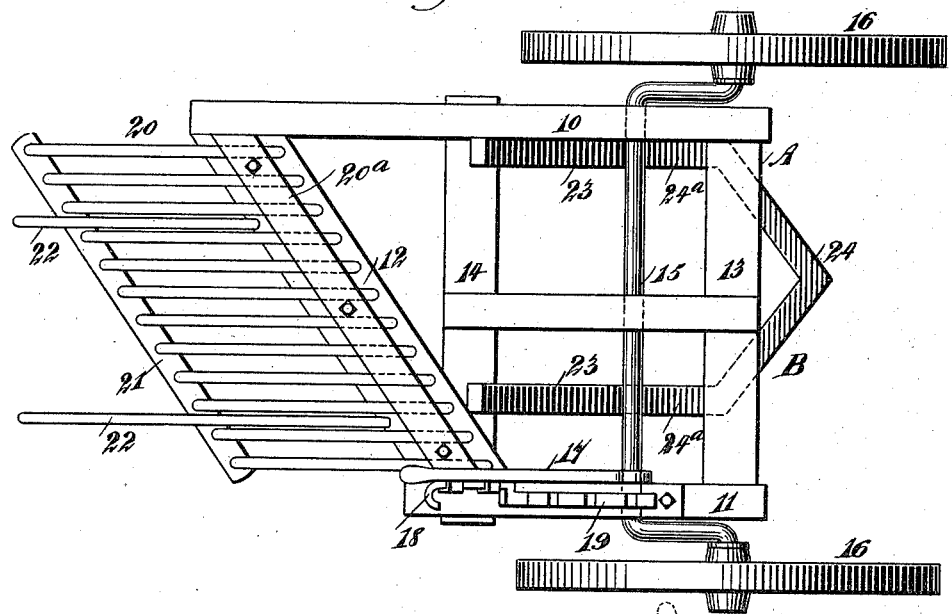
Figure 2:
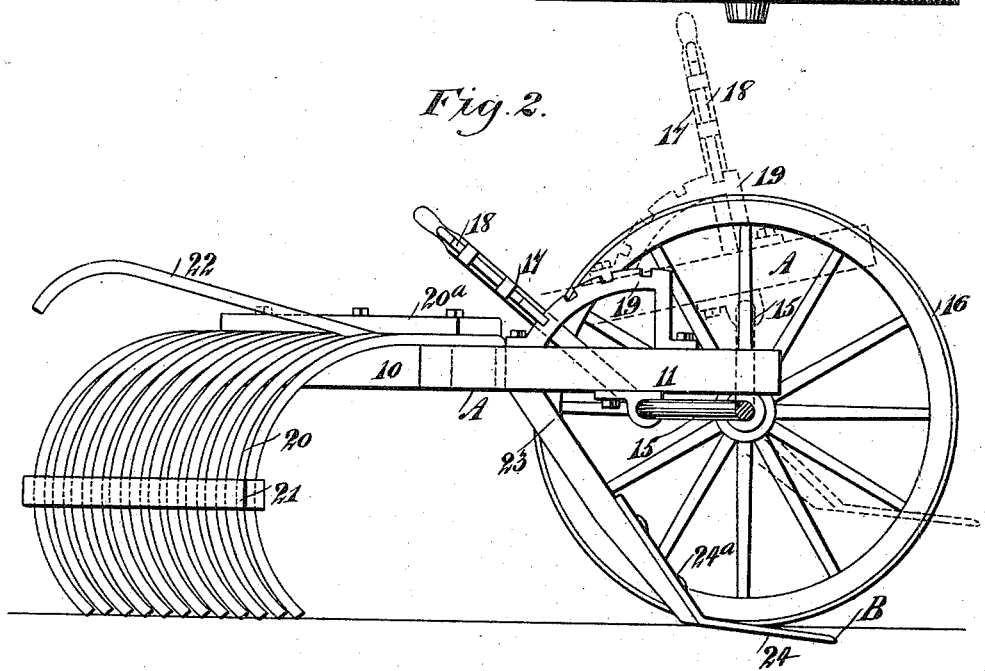

Figure 1 is a plan view of the machine, and Fig. 2 is a side elevation of the same.

In carrying out the invention the frame A of the machine may be said to consist of a left-hand side beam 10, a right-hand side beam 11, shorter than the left-hand beam, a rear diagonal bar 12, connecting the rear extremity of the longer side beam with the corresponding end of the shorter one 11, a front cross-bar 13, and an intermediate bar 14. A bow or arched axle 15 is journaled in suitable bearings secured to the side beams 10 and 11, and at the ends of the said bow or arched axle horizontal spindles are formed, upon which supporting or carrying wheels 16 are loosely mounted. The axle is raised or lowered, so as to carry the frame to or from the ground by means of a lever 17, which is secured to the axle, preferably, near the right-hand beam 11 of the frame, and the said lever is provided with a thumb-latch 18, or with a latch of other description, adapted for engagement with a rack 19, which is ordinarily secured upon the aforesaid right-hand side beam of the frame.

A series of spring-teeth 20 are secured at their upper ends in the diagonal cross-beam 12 of the frame, and said teeth are clamped to the said cross-bar by means of an upper or head bar $20^a$. Consequently the teeth 20 are in diagonal arrangement with reference to the frame. These teeth curve downwardly and forwardly, and are of such length that when the frame is in its lower position they will enter the ground to a greater or less depth. The action of the teeth is a concerted one and the said teeth are held in alinement by means of a tie-bar 21, through which all of the teeth pass, the said bar being located at a convenient point between the upper and the lower ends of the teeth. The machine is preferably guided through the medium of handles 22, which are secured to the diagonal rear bar 12 of the frame and extend rearwardly therefrom.

In connection with the series of rake-teeth a shovel or spade B is employed, consisting of a substantially triangular working surface 24 of skeleton construction, being made from a single flat bar or a number of such bars connected, and the point of the spade or shovel is at the longitudinal center of the machine. The said spade or shovel is given a downward and a forward inclination, as shown in Fig. 2, and is provided at each of its ends with a shank $24^a$, and these shanks are attached in any suitable or approved manner to stocks or beams 23, which are preferably secured to intermediate cross-bars 14 in the main frame and extend downwardly in a forwardly direction.

The machine is of light draft and requires but one or two horses to work it even in the roughest ground, and operates as well on hilly or stony ground as on smooth or loamy ground, and it is likewise effectually operative on a hillside. The shovel or spade in entering the ground beneath the potatoes will break the soil, and on the rake-teeth following the lower ends of the teeth will reach beneath the potatoes and will serve to throw them up on the surface of the ground, if not previously thrown in that direction by the spade. As the teeth are preferably placed about two and a half inches apart the dirt is permitted to pass between them, and the potatoes are lifted to the top of the ground.

The rake is placed diagonally on the frame in order to permit the vines to be worked off to one side, leaving the potatoes in windrows, so that a farmer can drive a horse between the rows and gather the potatoes in a convenient and expeditious manner. No matter how heavy, wet, or green the vines may be, the machine will not be clogged, since said vines are quickly thrown off to one side.

In turning corners or in going to or from the field the spade or shovel and rake-teeth may be carried from engagement with the ground by elevating the axle as aforesaid. The machine is capable of digging potatoes planted six to eight inches deep, and will leave the ground in good condition and substantially level.

Having thus described my invention, I claim as new and desire to secure by Letters Patent—

1. A potato-digger, having a wheel-supported frame means for raising and lowering the said frame, a spade or shovel of skeleton form, the blade whereof is of substantially triangular shape and has a downward and forward inclination, supports attached to the frame and connected with the shanks of the shovel or spade blade, rake-teeth secured to the rear end of the frame and having a diagonal arrangement, and a tie-bar connected with all of the teeth and serving to give them concerted action and equal elasticity, substantially as shown and described.

2. A potato-digger, having a frame provided with a diagonal rear bar, an arched axle upon which the frame has pivotal support, the said axle being provided with horizontal spindles at its ends, supporting-wheels loosely mounted on the said spindles, a lever connected with the body portion of the axle, a locking device for the lever, beams projected forwardly and downwardly from the frame to a point below the axle, a spade or shovel of skeleton construction, the blade whereof is substantially triangular and given a downward and forward inclination, its shanks being secured to the aforesaid bars or beams, a series of rake-teeth secured to the rear diagonal bar of the frame and following the inclination thereof, a tie-bar connected with all of the said teeth and located at a point between their ends, and means for guiding the machine, as and for the purpose specified.

EDMUND B. FRINK.

Witnesses:
CLARENCE E. STANTON,
C. HAGERMAN.